US006873950B1

United States Patent
Voessing et al.

(10) Patent No.: US 6,873,950 B1
(45) Date of Patent: Mar. 29, 2005

(54) METHOD AND ENCODER FOR BIT-RATE SAVING ENCODING OF AUDIO SIGNALS

(75) Inventors: Walter Voessing, Hannover (DE); Fei Gao, Hannover (DE); Andreas Aust, Hannover (DE)

(73) Assignee: Thomson Licensing S.A., Boulogne-Billancourt (FR)

(*) Notice: Subject to any disclaimer, the term of this patent is extended or adjusted under 35 U.S.C. 154(b) by 839 days.

(21) Appl. No.: 09/629,109

(22) Filed: Jul. 31, 2000

(30) Foreign Application Priority Data

Aug. 9, 1999 (EP) .............................. 99115675

(51) Int. Cl.[7] .............................................. G10L 19/00
(52) U.S. Cl. .................... 704/229; 704/200.1; 704/219; 704/503
(58) Field of Search ................................ 704/229, 219, 704/200.1, 500–504, 230, 225, 206, 205, 212, 224, 211; 375/242

(56) References Cited

U.S. PATENT DOCUMENTS

| | | | |
|---|---|---|---|
| 4,604,721 A | | 8/1986 | Gray ............................ 364/726 |
| 5,294,236 A | * | 3/1994 | Baird ........................... 96/416 |
| 5,394,473 A | * | 2/1995 | Davidson ................. 704/200.1 |
| 5,451,954 A | * | 9/1995 | Davis et al. ................ 341/200 |
| 5,644,310 A | * | 7/1997 | Laczko et al. .............. 341/143 |
| 5,699,484 A | * | 12/1997 | Davis ....................... 704/200.1 |
| 5,764,698 A | * | 6/1998 | Sudharsanan et al. ...... 375/241 |
| 5,999,905 A | * | 12/1999 | Isozaki ........................ 704/500 |
| 6,226,608 B1 | * | 5/2001 | Fielder et al. .............. 704/229 |

OTHER PUBLICATIONS

Yang, et al. *Prime Factor Decomposition of the Discrete Cosine Transform and its Hardware Realization International Conference on Acoustics*, Speech & Signal Processing. ICASSP, US, New York, IEEE, vol. Conf. 10, p. 772–775 XP000745360.

Pan, D. *An Overview of the MPEG/Audio Compression Algorithm*, Proceedings of the SPIE, US, SPIE, Bellingham, VA., vol. 2187, p. 260–273 XP000571198.

Aloisio, G. *A Concurrent Implementation of the Prime Factor Algorit. on Hypercube, IEEE Transactions on Signal Processing*, US, IEEE, Inc New York, vol. 39, No. 1, p. 160–170, XP000205158.

Search Report and Priority Document.

* cited by examiner

*Primary Examiner*—Vijay B. Chawan
(74) *Attorney, Agent, or Firm*—Joseph S. Tripoli; Ronald H. Kurdyla; Joel M. Fogelson

(57) ABSTRACT

MPEG 1 Audio data compression is based on subband coding. A quantization is performed using a psychoacoustic model which is adapted to the masking behavior of the human hearing. Each subband signal is quantized in such a way that the quantization noise introduced by the coding will not exceed the masking curve for that subband. In ISO/IEC 11172-3 two independent psychoacoustic models are defined. The output from these psychoacoustic models is a set of Signal-to-Masking Ratios, $SMR_n$, for every subband n. In order to calculate the $SMR_n$ for the psychoacoustic model 2 according to the invention a Fast Fourier Transformation is performed with a length of L=1152 samples by calculating k subtransformations over $2^N$ samples with $k*2^N=L$ and fitting together the results of the k subtransformations.

6 Claims, 1 Drawing Sheet

METHOD AND ENCODER FOR BIT-RATE SAVING ENCODING OF AUDIO SIGNALS

FIELD OF THE INVENTION

The invention relates to a method and an encoder for bit-rate saving encoding of audio signals, especially for encoding of audio signals according to MPEG 1 Audio Layer II.

BACKGROUND OF THE INVENTION

The MPEG 1 Audio standard as specified in ISO/IEC 11172-3 defines three operational modes known as Layers I, II and III. Each Layer offers increased compression but also increased encoding complexity, whereby downward compatibility is guaranteed. Therefore, a Layer II decoder can also read a Layer I data stream but no Layer III data stream. Also a Layer III decoder can decode all MPEG 1 Audio bit streams, i.e. Layer I to III.

MPEG 1 Audio data compression is based on subband coding. The audio signal is split into 32 subbands of equal width. A quantization is performed using a psychoacoustic model that is adapted to the masking behaviour of the human hearing. Each subband signal is quantized in such a way that the quantization noise introduced by the coding will not exceed the masking curve for that subband. After quantization the samples build—together with the scale factors and further coding information—a frame structure for transmission.

In ISO/IEC 11172-3 two independent psychoacoustic models are defined which can be adapted to any Layer. The output from these psychoacoustic models is a set of Signal-to-Masking Ratios, $SMR_n$, for every subband n.

In order to calculate the $SMR_n$ for the psychoacoustic model 2 a Fast Fourier Transformation (FFT) with a length of 1024 samples is used, which has to run two times per channel, i.e. four times for a stereo channel.

SUMMARY OF THE INVENTION

The invention is bases on the object of specifying a method for bit-rate saving encoding of audio signals using a psychoacoustical model with reduced computing power.

It is a further object of the invention to disclose an encoder which utilizes the inventive method.

The invention is based upon the following realization. On the one hand a FFT is a special discrete Fourier Transformation for which the number of samples has to be a power of two, e.g. 1024 samples. However, on the other hand the frame length of MPEG 1 Audio Layer II is 1152 samples which is no power of two. This results in the two runs per channel of the FFT according to prior art. The known formula for a discrete Fourier Transformation, which calculates for L elements of a data series z(n) the corresponding L frequency values F(m), $$F(m) = \frac{1}{L}\sum_{n=0}^{L-1} z(n)\exp\left(-j2\pi\frac{mn}{L}\right)$$

can be transformed first into k partial sums with M summands each $$F(m) = \frac{1}{L}\sum_{i=0}^{k-1}\left[\sum_{n=0}^{M-1} z(kn+i)\exp\left(-j2\pi\frac{m(kn+i)}{L}\right)\right]$$

and finally with L=kM and splitting the exponential function into $$F(m) = \frac{1}{k}\sum_{i=0}^{k-1}\left[\frac{1}{M}\sum_{n=0}^{M-1} z(kn+i)\exp\left(-j2\pi\frac{mn}{L}\right)\right]\exp\left(-j2\pi\frac{mi}{L}\right).$$

Therefore, using k subtransformations with a length of $M=2^N$ allow time effective calculation with Fast Fourier Transformations, even if L is not a power of two.

In principle, the method for bit-rate saving encoding of audio signals using a psychoacoustic model, wherein a Fourier Transformation is performed for calculation of a minimum masking threshold and wherein L samples of the audio signal are arranged in a frame for transmission, consists in the fact that the Fourier Transformation is performed with a length of L samples by calculating k subtransformations over $2^N$ samples with $k*2^N=L$ and fitting together the results of the k subtransformations.

In this way, the duplicate run per channel is avoided without lost of information or introduction of errors. Therefore, the computing power is reduced nearly to the half. This is especially important for the implementation on digital signal processors to run in real time.

Although the inventive method is especially advantageous, if the number k of subtransformations is not a power of 2, the use of the invention is not restricted to such values of k.

Advantageously, before fitting together the results of the k subtransformations, these are multiplied with phase correction factors.

In an advantageous manner, the Fourier Transformation is performed within the algorithm for the psychoacoustic model 2 of MPEG I Audio Layer II, wherein the frame length L is 1152 samples.

In an advantageous development k=9 subtransformations with a length of $M=2^N=128$ samples are calculated.

BRIEF DESCRIPTION OF THE DRAWINGS

Exemplary embodiments of the invention are described with reference to the FIGURE, which shows schematically the use of the subtransformations.

DETAILED DESCRIPTION OF PREFERRED EMBODIMENTS

Figure 1:
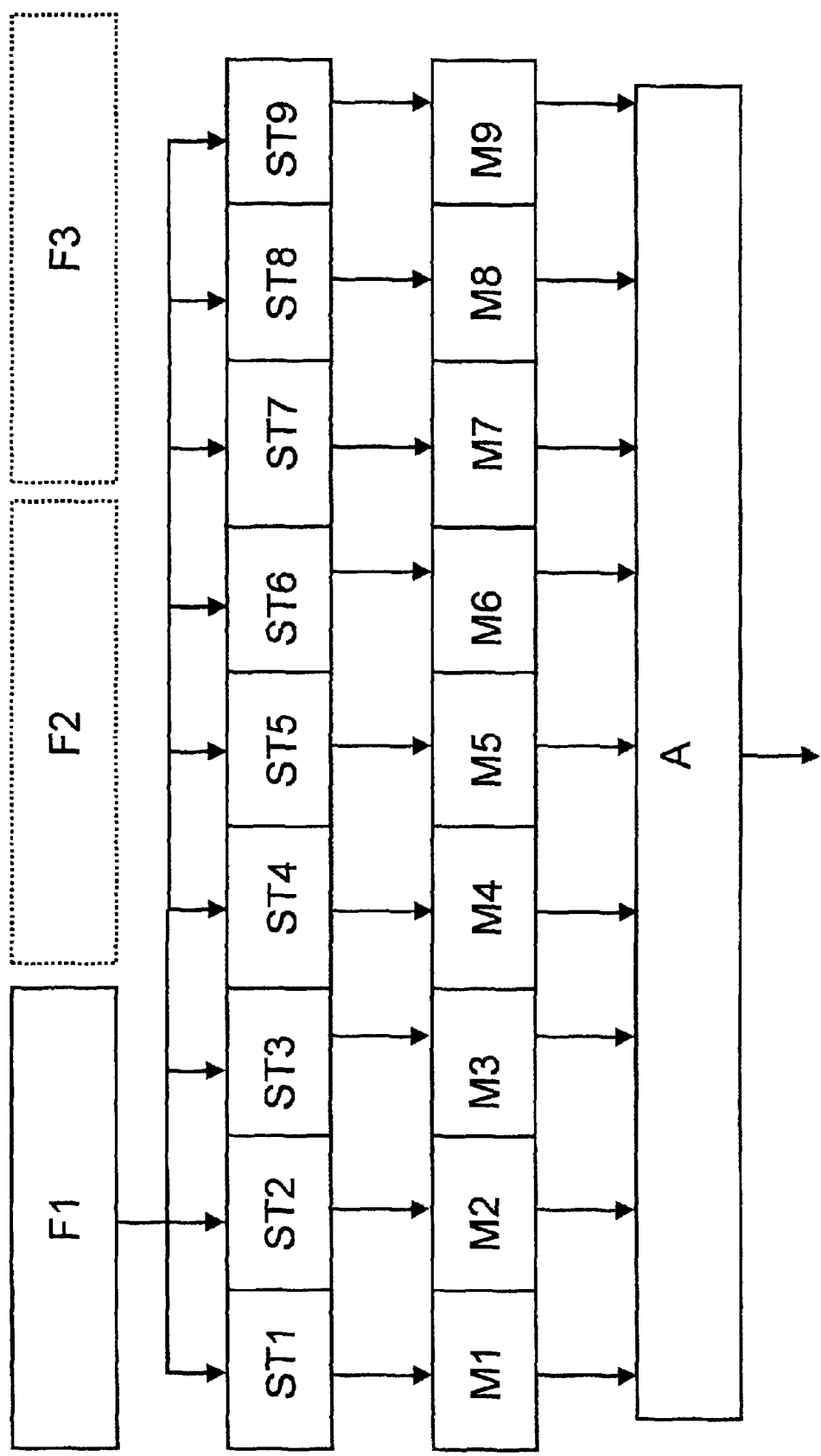

Although the encoder is not standardized in ISO/IEC 11172-3, certain means for encoding such as the estimation of the masking threshold or quantization are commonly used and therefore are not described in detail in the following. First of all PCM audio samples with a sampling frequency of 32, 44.1 or 48 kHz (or with half sample frequencies of 16, 22.05 or 24 kHz) are fed into the encoder. A mapping is performed to creat a filtered and subsampled representation of the input audio stream in the form of so-called subband samples. Each subband signal is quantized in such a way that the quantization noise introduced by the coding will not exceed the masking curve for that subband. In order to control the quantization a psychoacoustic model is used to calculate the new bit allocation, for MPEG 1 Audio Layer II for three blocks totaling 36 subband samples corresponding to 1152 input PCM samples. The calculation is based on the Signal-to-Masking Ratios, $SMR_n$, for all the subbands, which makes it necessary to determine for each subband the maximum signal level and the minimum masking threshold. The minimum masking threshold is derived by using the inventive method which is schematically shown in FIG. 1. After windowing the input PCM samples, samples corresponding to a frame F1 are split and fed to nine subtransformation ST1, . . . , ST9. Each subtransformation has a length of 128 samples (9*128=1152) which is the seventh power of 2 ($2^7$=128). After Fast Fourier Transformations of the partial signals the results of the nine subtransformations are multiplied with phase correction factors, symbolized by multiplier units M1, . . . , M9. The phase corrected data are combined, symbolized by adder unit A and then used for the further calculation of the psychoacoustic model. The same method is applied to the following audio samples corresponding to frames F2, F3 etc.

The invention can advantageously be used for encoding of audio signals according to MPEG 1 Audio Layer 2, but also applies to the encoding of any other kind of digital data.

The invention can be implemented in any kind of encoders which can be used e.g. for Digital Audio Broadcast (DAB), Cable and satellite radio/TV or digital recording devices like DVD-VRs etc.

What is claimed is:

1. Method for bit-rate saving encoding of audio signals using a psychoacoustic model, comprising the steps of:

performing a Fourier Transformatlon with a length of L samples for calculation of a minimum masking threshold by calculating k subtransformations over $2^N$ samples with $k*2^N=L$;

fitting together the results of the k subtransformations;

arranging L samples of the audio signal in a frame for transmission.

2. Method according to claim 1, wherein the number k of subtransformations is not a power of 2.

3. Method according to claim 1, wherein before fitting together the results of the k transformations, these are multiplied with phase correction factors.

4. Method according to claim 1, wherein the Fourier Transformation is performed within the algorithm for the psychoacoustic model 2 of MPEG I Audio Layer II and wherein the frame length L is 1152 samples.

5. Method according to claim 4, wherein k=9 subtransformations with a length of $M=2^N=128$ samples are calculated.

6. Encoder for performing the method according to claim 1.

* * * * *